Patented July 30, 1935

2,009,545

UNITED STATES PATENT OFFICE 2,009,545

UREA AND/OR UREA DERIVATIVE PLASTIC AND PROCESS OF MAKING SAME

Carleton Ellis, Montclair, N. J.

No Drawing. Application April 20, 1929,
Serial No. 356,878

18 Claims. (Cl. 18—55)

This invention relates to plastic compositions, especially those of the resinous type, in which two or more synthetic solids or resins are used as binders for filling material or as the sole plastic structure without filling agents.

Molding compositions may be made from a binder comprising phenolic resins and urea condensation products with various aldehydes, especially formaldehyde. I have noted that the reaction on hot pressing is a complex one, the urea compound perhaps forming methylene urea and the substance $C_5H_{10}N_4O_3$ in part and also doubtless reacting with the phenol formaldehyde product to an indefinite extent. In place of phenol, cresol, naphthol and other reactive bodies are not excluded. Acetaldehyde also may be used with, or in some cases in substitution for, formaldehyde. The employment of other aldehydes such as propyl, butyl aldehydes, benzaldehyde, acrolein and so forth, is not precluded.

Still another composition is that involving a mixture of dimethylol urea and monomethylol urea incorporated in various proportions as for example equal parts by weight. While this material may be used by itself for molding purposes it may also be admixed with the fusible phenol formaldehyde resin for example as above described or with a furfural phenol resin or a furfural aniline resin; the proportions used being for example equal parts or compositions containing more of one constituent than the other.

Dimethylol urea also may be incorporated with phenol sulphur resins made by reacting on phenol with sulphur chloride, using 10 per cent and upwards of dimethylol urea or dimethylol thiourea or mixtures thereof.

Dimethylol urea also may be incorporated with a resin obtained by reacting on acetone or other ketone with formaldehyde.

Dimethylol urea may be incorporated with natural resins such as shellac and copal resin. Thus cracked Congo resin as "run" by heat treatment in the manufacture of varnishes may be utilized. Also bodies of the nature of asphaltum or gilsonite may be used.

Various fillers or extending agents as indicated may be employed for example mineral fillers gypsum, whiting, mica, infusorial earth, clay and asbestos or organic fillers such as cotton flock, wood pulp, saw dust, wood flour, cork, leather scrap, paper and cloth.

Molding compounds may be made by mixing such fillers as, for example, equal parts of filler and the urea-thiourea binder to form molding powders. The filler may be simply ground with the binder or may be impregnated by means of a solution. Or the materials may be incorporated and worked out into sheeted form. This may be accomplished by mixing on differential rolls and then running through sheeting rolls.

Shaped articles made under heat and pressure in accordance with the immediate foregoing may be defined or characterized by the presence of a heat-set urea derivative including a sulphur-containing resin or plastic.

The following subject matter relates especially to the use of organic acids in lieu of mineral acids for carrying out the reaction. While mineral acids do not enter into combination, at least to any material extent, some of the organic acids appear to enter into combination yielding a resinous complex of modified properties. The employment of organic acids both monobasic, dibasic, and polybasic such as lactic, succinic, tartaric, citric, malic, oxalic acetic anhydride, propionic, maleic, mucic, trichloracetic, stearic, and other acids in the aliphatic series, and benzoic, salicylic, acetyl salicylic, phthalic, gallic, tannic acid and the like in the aromatic series (and their corresponding anhydrides when these occur) is feasible. The proportion of acid employed in making the urea or thiourea plastic or mixed urea-thiourea aldehyde condensation products may vary from slight or catalytic proportions to those of a more substantial character as more particularly set forth in Patent No. 1,846,853, patented February 23, 1932.

When urea and formaldehyde are caused to react without an acid as for example by simple heating together a product is obtained which is very quickly discolored at high temperatures. The same is true when urea and formaldehyde are caused to react in the presence of a base, such as an alkali or hexamethylenetetramine. Such products seem to be rather sensitive to heat at temperatures above 100° and tend to turn yellow or brown. In attempting to mold such products discoloration is likely to occur. With the phthalic product a marked resistance to discoloration by heating is noted. This is important in making white articles which retain their color on baking or molding in a hot press.

*Example.*—A preferred mixture is made by boiling together 15 parts of urea, 15 parts of phthalic anhydride and 60 parts of ordinary aqueous formaldehyde of 37 to 40 per cent strength. The mixture may be boiled in an open flask for 12 to 15 minutes or longer if necessary to bring about clarification. The use of a reflux condenser is not always desirable because it may tend to cause the syrup to deposit a heavier precipitate of white material on standing. However, suitable arrangements may be made such as an ordinary condenser (not refluxing) to collect any distillate and recover formaldehyde. In some cases the heating may be carried out in an autoclave under pressures above atmospheric.

Various tests were made with the syrupy material such as described in example as a binder for the customary fillers employed in the plastic molding art with the object of producing molded articles which were heat resistant. Thus 50 parts by weight of syrup were mixed with 100 parts of asbestos fibre and dried in a vacuum to 90°, then ground and pressed for 10 minutes in a hydraulic press at 110° C. An infusible heat-resistant molded article was obtained having a good glossy surface, slighly gray in color due to the asbestos employed.

In another case equal parts of syrup and wood flour were well mixed and dried in a vacuum dryer up to 75° C. When placed in the hot press and molded at 110° C. the molded article was found to be unsatisfactory because of what is termed overcuring. Another mixture in the same proportions was dried up to 50° C. in a vacuum dryer until the moisture was removed and then ground. Finally it was air-dried for 4 hours. On pressing in a hydraulic press at 110° C. for 10 minutes, pressure of 3000 pounds a light yellow translucent hard tough molded article was obtained.

No mold lubricant was required, the molded article leaving the hot mold freely without sticking. A temperature of 110° C. is a relatively low one for molding purposes and was used in the present case in order to give as favorable results as possible in regard to light color. The temperature of molding may however be increased with consequent increase in speed of setting or curing in the mold to produce an infusible article which may be taken from the mold without necessity of cooling.

Among the uses for the product of the present invention is in making dishes and other molded articles. See Patent 1,846,853.

The material of the present invention may be mixed with other substances such as resins, nitrocellulose, or other cellulose esters or ethers, with shellac solutions, either aqueous or alkaline, and the like.

The syrupy material may be poured out in pans and allowed to set and harden preferably baking at 50 to 60° C. thereby obtaining sheeted material which may be stamped into the form of dishes, ash trays, parts of toys and the like.

A simple phenol furfural resin of a fusible, soluble nature is readily formed as set forth, for example in Patent No. 1,771,033, patented July 22, 1930.

Such resin may be incorporated with urea formaldehyde condensation products such as dimethylol urea. Dimethylol urea 20 parts by weight, phenol furfural resin 100 parts, denatured alcohol 100 parts. Add wood flour 100 parts and mix well. Dry in vacuo and use for molding. The composition may be modified by the addition of 10% of hydrated lime ground with the dried mix in a ball mill. Sometimes it is desirable to add a small amount of stearic acid, say one-half to one per cent, which may be incorporated by adding to the alcohol solution. When hydrated lime is present some calcium stearate will be formed. The addition of rosin in the presence of calcium hydrate will yield calcium resinate.

A number of the resinates, such as those of the alkaline metals and heavier metals, may be employed in small proportion as a means to prevent sticking.

The plastic material may be made by reacting on a mixture of urea and thiourea with a solution of formaldehyde. In molding the urea thiourea plastic, whether such product is made by simultaneous reaction of formaldehyde on a mixture of urea and thiourea or whether the urea and thiourea are separately treated with formaldehyde and the resulting condensation products mixed, the same precautions should be taken with respect to the molding range of temperature, as I have set forth above. A desirable temperature is 120° to 130° C. Preferably I avoid exceeding 140° or 145° C., the maximum temperature ordinarily being 150° C. When other resins of a modifying character are present, such as various synthetic resins or natural resins and the like, the temperature range may be slightly broadened.

I have discovered that the urea type of resins or plastics are extremely sensitive to heat and very readily destroyed when the attempt is made to mold them at the normal temperatures employed in other molding operations of the character of the phenol formaldehyde plastics. My invention, therefore, embraces the molding of the resins of the present invention at temperatures above that at which sufficient softening occurs to create molding plasticity such, for example, as 110° C., this temperature depending, however, to some extent upon the presence or absence of plasticizing bodies, and maintaining as the upper range or point at which destruction, disintegration, blistering and granularity occur, a temperature not in excess of 150° C. This maximum temperature, it should be noted, is in a general way well below the temperatures employed in commercial molding of bakelite and similar thermosetting resinous compositions.

I have referred to dishes or containers of various sorts made from the urea type of binder or plastic material. The present invention also embraces the production of articles of the container or dish type made from such plastics, especially those that are translucent and are colored with suitable colors or dyes. If a filler is employed, preferably it should be one which will not greatly impair the translucency of the plastic, suitable fillers being glassine pulp, shredded tissue, viscose sheets such as cellophane or fine particles thereof. Mineral fillers such as glue, asbestos, talc, whiting and so forth, cause extreme opacity with a dullness of surface and lack all depth of color which, for many purposes, is undesirable. By using the urea plastic alone, or preferably with a filler which does not greatly impair translucency, I am able to employ dyes to full advantage, securing bright colors with a pleasing depth of color not obtainable with the opaque filler. Therefore, in making colored articles of the dish or container type and the like, I prefer to employ compositions which secure these translucent effects. Furthermore, by introducing into different parts of the mold differently colored molding compositions and then hot pressing within the temperature range specified, variegated colored articles are secured. These often are of very attractive appearance. Referring in this connection to the upper temperature of molding range, it should be noted that certain reactions may take place at higher temperatures in the hot press which tend to impair the color of the molded article. A certain granularity of surface, together with possible action on the dye itself, will often occur at a temperature of about 150° C. and in making many colored or multi-colored dishes or containers I prefer to keep the temperature of molding well below 150° C. in order that the brilliancy of the colors and the translucency of the product may be secured to the fullest degree.

The flow temperature, that is the range during which flowing in the mold suitable for the formation of plastic articles takes place, ranging from the initial flow point to the critical temperature of blistering, disintegration and white granulation, is therefore approximately about 40° C., that is, there is a critical range of only 40° within which temperature the molding is conducted. Such critical temperature range or flow range forms a main feature of the present invention.

Finally it should be noted that a substance such as dimethylol urea gives off formaldehyde on heating within the molding range to form a heat set article and such evolution of formaldehyde is useful as a reactant with substances capable of absorbing it and becoming hardened thereby. The molding of compositions containing dimethylol urea, therefore, is facilitated by having present such a formaldehyde absorbent capable of reacting and interreacting to form a complex of desirable qualities.

This application is a continuation, in part, of prior applications, Serial Nos. 689,165, filed January 23, 1924, and 735,600, filed September 3, 1924. In application Serial No. 689,165, there is disclosed and claimed the production of urea-formaldehyde type condensation products produced in the presence of acid condensing agents. In Serial No. 735,600, there is disclosed and claimed the production of condensation products of urea and thiourea with formaldehyde, and of urea-formaldehyde type condensation products with plasticizing sulphur-containing bodies. The instant application is concerned with molding compositions and molded articles and methods of making same.

What I claim is:

1. A molding composition comprising a plurality of resins one of which is an acid catalyzed resin of the urea-formaldehyde type capable of interreacting on hot pressing and hardening in the mold within a temperature range not less than 110° C. and not over 150° C.; said composition blistering, disintegrating and forming white granulations at temperatures in excess of said 150° C.

2. A molding composition containing a plastic of the acid catalyzed urea aldehyde condensation type and a natural resin, said composition being capable of hardening in the mold within a temperature range not less than 110° C. and not over 150° C.; said composition blistering, disintegrating and forming white granulations at temperatures in excess of said 150° C.

3. A molding composition containing a plastic organic acid catalyzed urea aldehyde condensation type and a synthetic resin, the composition being capable of inter-reacting on hot pressing and hardening in the mold within a temperature range not less than 110° C. and not over 150° C.; said composition blistering, disintegrating and forming white granulations at temperatures in excess of said 150° C.

4. A molding composition comprising a plastic of the acid catalyzed urea aldehyde condensation type and a phenol formaldehyde resin, the composition being capable of inter-reacting on hot pressing and hardening in the mold within a temperature range not less than 110° C. and not over 150° C.; said composition blistering, disintegrating and forming white granulations at temperatures in excess of said 150° C.

5. A molding composition comprising a plastic organic acid catalyzed urea aldehyde condensation type and a phenol furfural resin, the composition being capable of inter-reacting on hot pressing and hardening in the mold within a temperature range not less than 110° C. and not over 150° C.

6. A molding composition comprising a plastic of the acid catalyzed urea aldehyde condensation type and a synthetic sulphur containing resin, said composition being capable of interreacting on hot pressing and hardening in the mold within a temperature range not less than 110° C. and not over 150° C.

7. A molding composition containing a plastic of the acid catalyzed urea aldehyde condensation type and another resin, together with a filler, the composition being capable of inter-reacting on hot pressing and hardening in the mold within a temperature range not less than 110° C. and below that at which substantial blistering takes place.

8. A molding composition containing a plastic of the acid catalyzed urea aldehyde condensation type, another resin, and an organic filler, the composition being capable of inter-reacting on hot pressing and hardening in the mold within a temperature range not less than 110° C. and not over 150° C.

9. A molding composition comprising a plurality of resins one of which is an acid catalyzed resin of the urea-formaldehyde type capable of inter-reacting on hot pressing and hardening in the mold within a temperature range not less than 110° C. and not over 150° C.; said composition blistering, disintegrating and forming white granulations at temperatures in excess of said 150° C.; said composition including a filler that does not impair translucency of the plastic obtained therefrom.

10. A molding composition containing a methylolurea, an acid condensing agent therefor and another resin, said composition being capable of hardening in the mold within a temperature range not less than 110° C. and not over 150° C.

11. A molding composition containing a methylolurla, an acid condensing agent therefor, another resin, and an organic filler, the composition being capable of inter-reacting on hot pressing and hardening in the mold within a temperature range not less than 110° C. and not over 150° C.

12. A composition as set forth in claim 1 which includes a mold lubricant.

13. A molding composition including a plastic containing an acid catalyzed urea aldehyde condensation product capable on hot pressing of hardening in the mold within a temperature range not less than 110° C. and below that at which substantial blistering takes place.

14. An article of manufacture substantially free from blistering and undesirable disintegration products comprising a pressure molded composition of the character set forth in claim 1, molded at temperatures below that at which substantial blistering takes place.

15. An article of manufacture substantially free from blistering and undesirable disintegration products, comprising a heat and pressure molded composition as set forth in claim 10, molded at temperatures below that at which substantial blistering takes place.

16. A dish substantially free from blisters and granulation, consisting of a hot-pressed acid catalyzed urea-formaldehyde type condensation product and a cellulose filler.

17. A dish substantially free from blisters and granulation, consisting of a hot-pressed acid catalyzed urea-formaldehyde type condensation product, a translucent filler, and a dye.

18. A molding composition containing an acid catalyzed urea-formaldehyde type condensation product, and more than 50% of fibrous filler.

CARLETON ELLIS.

CERTIFICATE OF CORRECTION.

Patent No. 2,009,545.

July 30, 1935.

CARLETON ELLIS.

It is hereby certified that error appears in the printed specification of the above numbered patent requiring correction as follows: Page 3, first column, line 65, claim 3, and second column, line 8, claim 5, before "organic" insert the words of the; and that the said Letters Patent should be read with these corrections therein that the same may conform to the record of the case in the Patent Office.

Signed and sealed this 17th day of December, A. D. 1935.

Leslie Frazer

Acting Commissioner of Patents.

(Seal)